(12) United States Patent
Bogin et al.

(10) Patent No.: US 6,523,093 B1
(45) Date of Patent: Feb. 18, 2003

(54) PREFETCH BUFFER ALLOCATION AND FILTERING SYSTEM

(75) Inventors: Zohar Bogin, Folsom, CA (US); Steven Clohset, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 264 days.

(21) Appl. No.: 09/675,893

(22) Filed: Sep. 29, 2000

(51) Int. Cl.[7] .............................................. G06F 12/00
(52) U.S. Cl. ...................................... 711/137; 711/213
(58) Field of Search ................................ 711/100, 137, 711/213

(56) References Cited

U.S. PATENT DOCUMENTS

| | | | | |
|---|---|---|---|---|
| 5,630,094 A | * | 5/1997 | Hayek et al. ............... 710/310 |
| 5,774,685 A | * | 6/1998 | Dubey ......................... 711/122 |
| 6,085,291 A | * | 7/2000 | Hicks et al. ................. 711/122 |
| 6,115,796 A | * | 9/2000 | Hayek et al. ................. 710/52 |
| 6,134,643 A | * | 10/2000 | Kedem et al. ............... 711/137 |
| 6,308,242 B1 | * | 10/2001 | Kim ............................. 711/135 |

* cited by examiner

*Primary Examiner*—Kevin Verbrugge
(74) *Attorney, Agent, or Firm*—Blakely, Sokoloff, Taylor & Zafman LLP

(57) ABSTRACT

A system is described for prefetching data from a main memory before the data is requested by a processor. The system includes a prefetch buffer having a number of entries to store prefetch reads. Each entry in the prefetch buffer includes a storage area designated for data and address. The system also includes a number of state machines, each state machine to track data phase for each entry in the prefetch buffer. A read request controller is coupled to the prefetch buffer and is configured to receive a read request from the processor or I/O devices and controls dispatching of prefetch requests to a main memory.

21 Claims, 5 Drawing Sheets

PREFETCH BUFFER ALLOCATION AND FILTERING SYSTEM

BACKGROUND OF THE INVENTION

1. Field of the Invention

The present invention generally relates to computer systems, and in particular, to a prefetch buffer allocation and filtering system.

2. Description of the Related Art

In conventional computer systems, instructions and data required by a processor may be retrieved from a main memory. However, the latency involved with retrieving information from the main memory can impose a burden on system performance. To improve system performance, prefetching techniques may be implemented to prefetch instruction/data into a faster memory device prior to the time the instruction/data is requested by the processor. In some implementations, the faster memory device may comprise a prefetch buffer located external to the processor so that the buffer can be loaded without effecting the bandwidth of the processor bus coupling the processor to the rest of the system.

Prefetching techniques require information from the main memory to be speculatively fetched into the prefetch buffers based on the principle that if a memory location is addressed by the processor, the next sequential address will likely be requested by the processor in the near future. However, speculative prefetch requests dispatched in an attempt to supply memory data to the prefetch buffer ahead of time to reduce latency may adversely effect system performance by reducing available bandwidth of a memory bus that provides a communications link between the main memory and the prefetch buffers, causing subsequent non-speculative fetch requests to wait for the speculative prefetch requests.

DETAILED DESCRIPTION OF THE INVENTION

Figure 1:
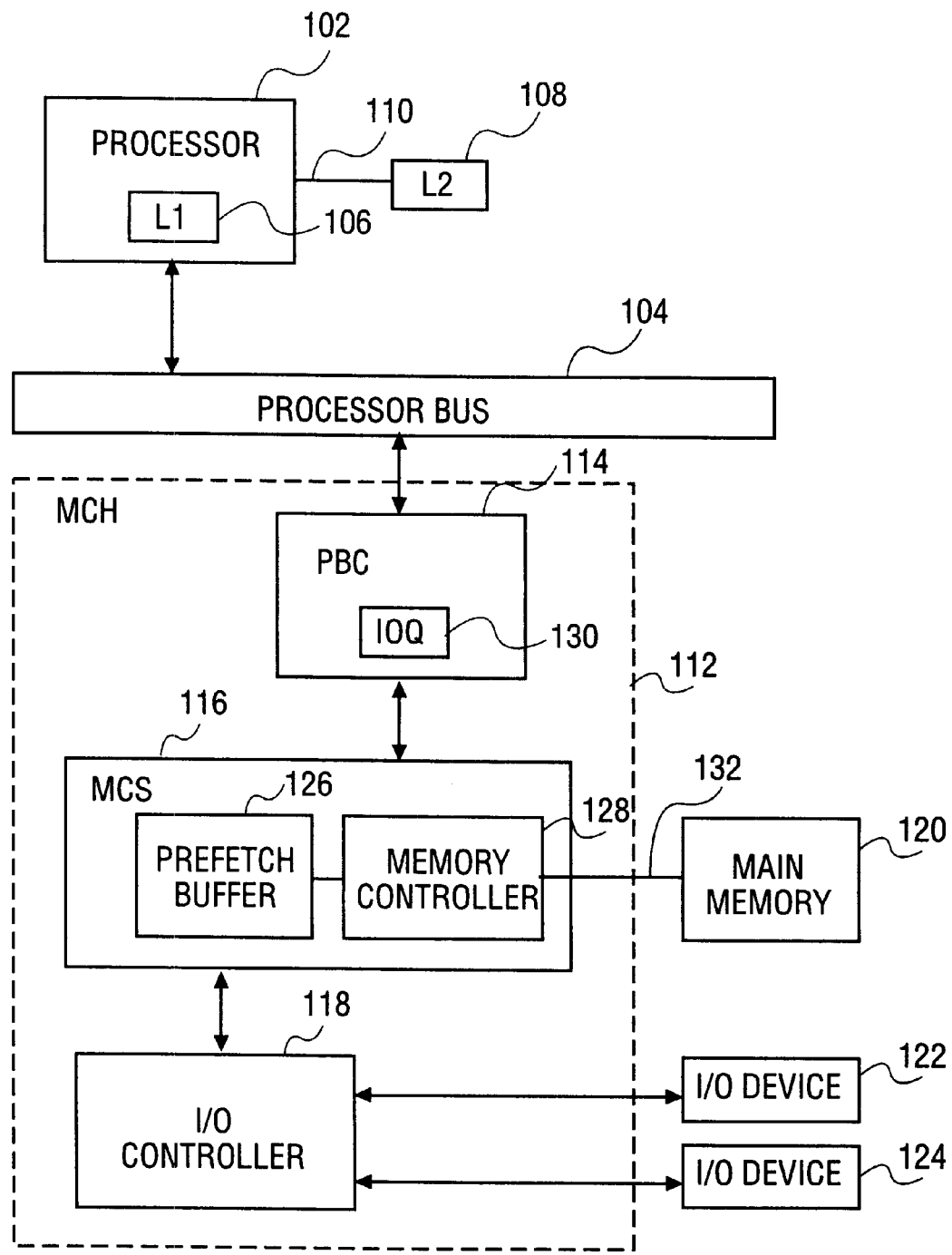
FIG. 1 is a block diagram of a computer system according to one embodiment of the invention.

FIG. 1 depicts one embodiment of a computer system in which the present invention may be implemented. The computer system includes a processor 102 coupled a processor bus 104. In one embodiment, the processor 102 is a processor from the Pentium® family of processors including the Pentium®, Pentium® Pro, Pentium® II and Pentium® III processors available from Intel Corporation of Santa Clara, Calif. Alternatively, other processors may be used. The processor may include a first level (L1) cache memory 106. In one embodiment, the processor 102 is also coupled to a cache memory, which is a second level (L2) cache memory 108, via a dedicated cache bus 110. The L1 and L2 cache memories can also be integrated into a single device. Alternatively, the cache memory may be coupled to each processor by a shared bus.

A memory controller hub (MCH) 112 is also coupled to the processor bus 104. Included in the MCH 112 are a processor bus controller (PBC) 114, a memory controller subsystem (MCS) 116 and an I/O controller 118. In the illustrated embodiment, a main memory 120 is coupled to the processor bus 104 through the MCH 112. The main memory 120 and the cache memories 106, 108 store sequences of instructions and data that are executed by the processor 102. In one embodiment, the main memory 120 includes a dynamic random access memory (DRAM); however, the main memory may have other configurations. Additional device may also be coupled to the memory controller hub 112, such as multiple main memory devices. The MCS 116 coordinates data transfer to and from the main memory 120 at the request of the processor 102 and/or I/O devices 122, 124. In accordance with one aspect of the invention, the MCS 116 includes a prefetch buffer 126 coupled to the main memory 120 via a memory controller 128. Data and/or sequences of instructions executed by the processor 102 may be retrieved from the main memory 120, the cache memories 106, 108, the prefetch buffer 126 or any other storage device. The computer system is described in terms of a single processor; however, multiple processors can be coupled to the processor bus.

Figure 2:
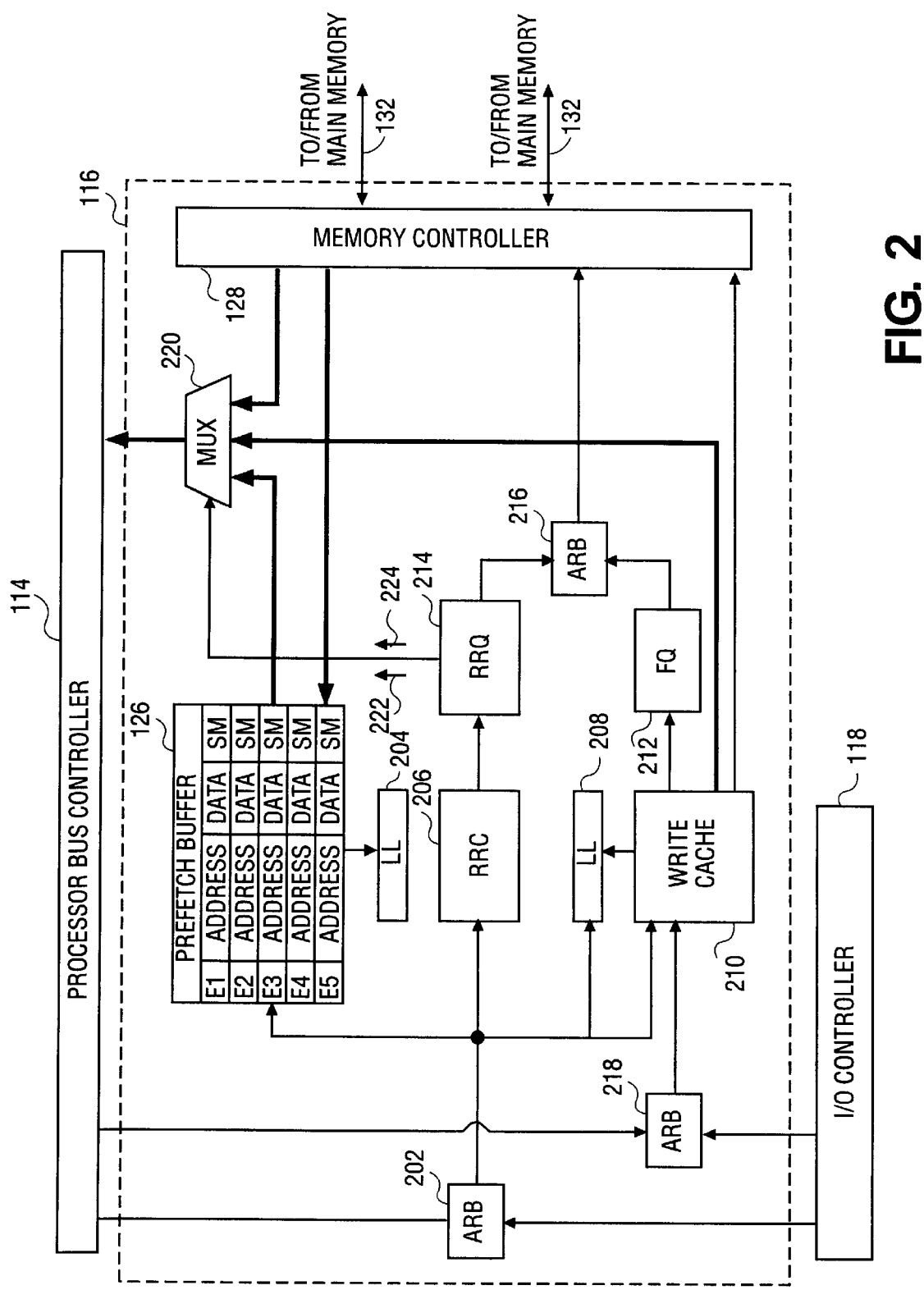
FIG. 2 is a block diagram of a memory controller subsystem according to one embodiment of the invention.

FIG. 2 depicts a memory controller subsystem 116 according to one embodiment of the invention. Memory access requests from the processor and/or I/O devices are forwarded to the arbitration logic (ARB) 202 via the processor bus controller 114 and the I/O controller 118, respectively. The arbitration logic 202 arbitrates among the requesting agents (e.g., processor and I/O devices) for access to the main memory by selecting and forwards one request at a time from one of the requesting agents to various components in the memory controller subsystem 116. In one embodiment, the arbitration logic 202 sends a selected request to the prefetch buffer 126, a corresponding lookup logic 204, a read request controller (RRC) 206, a write cache 210 and a corresponding lookup logic 208.

The prefetch buffer 126 contains a number of entries to store speculative memory reads for the processor. Each entry of the prefetch buffer includes an address, data, a state machine and an age. According to another aspect of the present invention, a prefetch streaming logic is implemented by the RRC 206 to prefetch the next subsequent address from the main memory in the event the prefetch buffer contains the data requested by the processor 102. When the processor 102 issues a read request, the address specified in the read request is compared against all valid entries in the prefetch buffer 126 using the lookup logic 204 to determine if the read request hits one of its entries. If the read request from the processor 102 hits an entry in the prefetch buffer 126, the corresponding data is returned to the processor and the next sequential address is prefetched from the main memory. Thus, once the processor 102 starts a stream of read requests, in an incrementing fashion, the memory controller subsystem 116 is able to stay ahead by prefetching the next sequential address. From the bandwidth point of view, the prefetch streaming does not effected the bandwidth of the memory bus 132, since each time the processor requests an address or a cacheline, the RRC 206 dispatches only one read request to the main memory to fetch the next address or cacheline, so there is still one to one correspondence between a read request from the processor to a read request to the main memory.

One problem associated with starting a prefetch stream is that at certain point in time, the processor 102 issues a read request and the address associated with the read request is not found in any of the entries in the prefetch buffer 126. To start a prefetch streaming, the memory controller subsystem 116 must fetch the data requested by the processor 102 as well as prefetch the next subsequent address or cacheline. This means that one request from the processor 102 corresponds to two requests from the main memory, one request to fetch the data requested by the processor and another request to prefetch the next sequential address or cacheline. Consequently, speculative prefetch requests can place burden on the memory bus 132 coupled between the main memory 120 and the memory controller 128 and thereby ultimately causing subsequent fetch requests to wait for the prefetch requests. For example, if the processor 102 happens to issue a read request which triggers dispatching of a speculative prefetch, and immediately thereafter the processor issues another request, the speculative prefetch dispatched could delay subsequent requests from the processor. Hence, to avoid delay caused by non-speculative requests waiting for return of speculative prefetch data from the main memory, a prefetch filter logic is implemented in the memory controller subsystem, which will be discussed more in detail with reference to FIGS. 4 and 5.

Referring to FIG. 2, the read requests from the RRC 206 (e.g., fetch and prefetch requests) are loaded into a read request queue (RRQ) 214. In one embodiment, the RRQ 214 contains four entries to handle up to four pending requests. An arbitration logic 216 arbitrates among various read and write requests emanating from the RRQ 214 and a flush queue (FQ) and forwards the requests to the memory controller 128.

Also included in the memory controller subsystem 116 is a multiplexer (MUX) 220 having a number of inputs 226, 228, 230 coupled to receive data from a number of different data sources, including the prefetch buffer 126, write cache 210, and the memory controller 128. The output 232 of the multiplexer 220 is coupled to the processor 102 via the processor bus controller 114. The multiplexer 220 is dynamically programmable to couple any one of the data sources to the processor 102. This coupling of one of the inputs of the multiplexer 220 to the processor bus controller 114 is controlled by a destination signal 222 sent by the RRQ 214. In addition to the destination signal 222, the multiplexer 220 also receives a token 224 that points to a specific entry in the prefetch buffer 126. For example, if a read request hits an entry in the prefetch buffer 126, the destination signal 222 and the token 224 from the RRQ 214 are used to indicate which entry in the prefetch buffer the requested data can be retrieved from. Similarly, if a read request hits an entry in the write cache 210, the destination signal 222 and token 224 from the RRQ 214 will indicate that the data is stored in a particular entry of the write cache 210.

Figure 3:
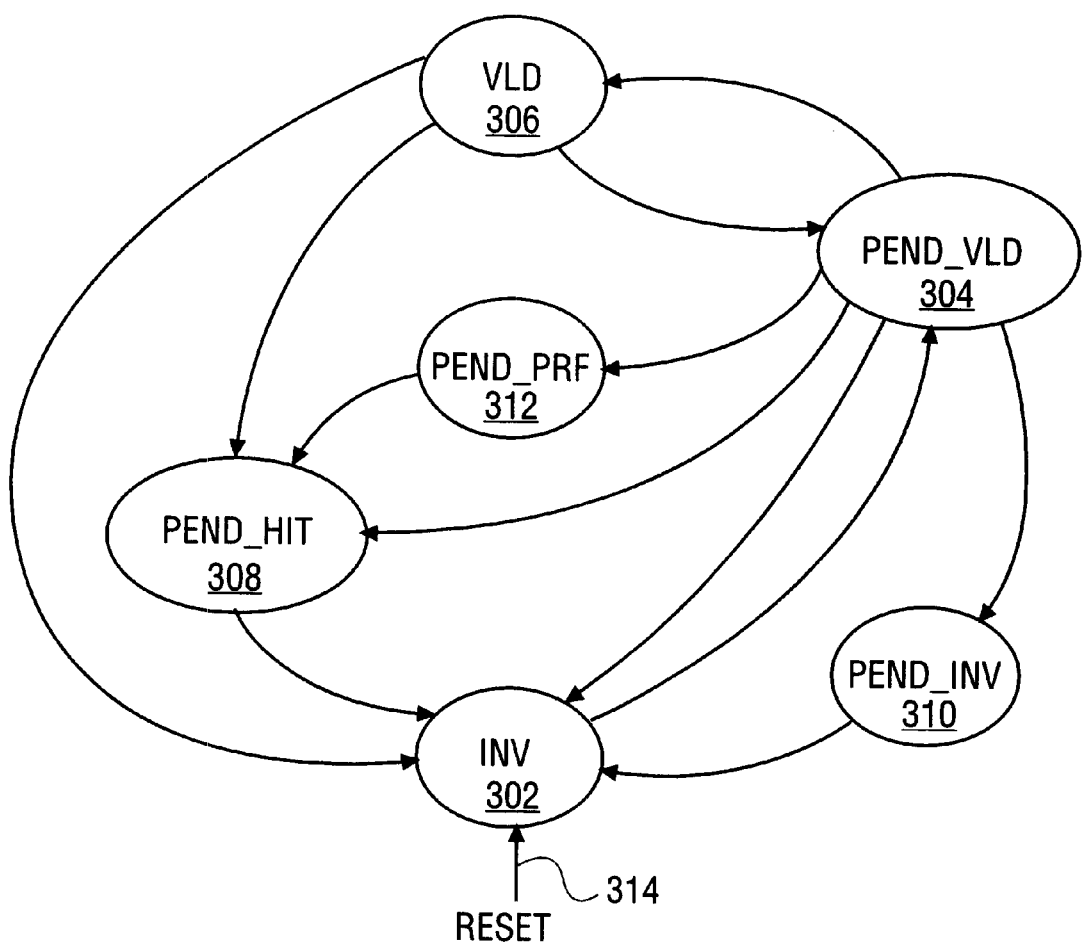
FIG. 3 is a state diagram of a state machine incorporated into the prefetch buffer according to one embodiment of the present invention.

FIG. 3 depicts a state diagram for a state machine incorporated into the prefetch buffer 126 to track the data phase for each entry in the prefetch buffer. Each entry is either invalid (INV) 302, pending valid (PEND_VLD) 304, valid (VLD) 306, pending hit (PEND_HIT) 308, pending invalid (PEND_INV) 310 or pending prefetch (PEND_PRF) 312. When the computer system boots up or is reset, each entry is initialized in the INV state 302 to indicate that the entry contains no valid information. Then, when a prefetch request is dispatched to the main memory 120 and before the data is returned to an allocated entry in the prefetch buffer 126, the state of the allocated entry changes from INV state 302 to PEND_VLD state 304. This corresponds to a situation where an entry is in INV state 302 and the processor 102 requests for data from address X and this causes the RRC 206 to dispatch a speculative prefetch to read address X+1. This causes the state of the entry to change to PEND_VLD 304 to indicates that the entry has been allocated by the RRC 206 to receive a prefetch data but the data has not been received. Shortly after the prefetch request is dispatched, the requested data will be returned from the main memory 120 and the state of the entry will change to VLD 306 to indicate that the entry has just received a valid prefetch data. Once the entry is in VLD state 306 and a read request from the processor 102 hits the entry with a valid prefetch data, the entry will change its state status from VLD 306 to PEND_HIT 308 to ensure that the data is not destroyed before the data is actually transferred to the processor 102. In other words, every time the processor 102 hits an entry with valid prefetch data, the entry will remain in PEND_HIT state 308 until the data is actually returned to the processor, since it may take one or more clock cycles before the data is actually transferred.

According to another aspect of the invention, the prefetch buffer 126 behaves like a one-shot cache in that once the processor 102 hits an entry in the prefetch buffer 126 and the corresponding data has been returned to the processor, the entry becomes invalid. By doing this, more entries in the prefetch buffer 126 are available for subsequent prefetch streams since each entry is reused once the entry has been read by the processor. Thus, once an entry is in PEND-HIT state 308 and the requested data has been transferred to the processor 102, the entry will change its state to INV 302 to indicate that the entry no longer contains valid information. This means that once the data requested by the processor has been found in the prefetch buffer and has subsequently been forwarded to the processor, the corresponding entry becomes invalid until it is allocated for another prefetch request. This is contrary to a conventional cache or buffer that stores prefetch data, since the data in the conventional cache will still remain in the cache some time later and is accessible by reading the same address. One reason for not keeping the data around after the processor has read it once is that the processor 102 has its own set of cache memories 106, 108 and in general, the processor will not issue a read request to the same memory location within a short period of time.

In some situations, the state of an entry may go directly from VLD 306 to INV 302 if the processor 102 or I/O devices 122, 124 happens to write to the same memory address currently residing in one of the entries in the prefetch buffer 126, which would make the corresponding data in the prefetch buffer invalid. In other words, any time there is a write request made to the same address as the address contained in the prefetch buffer, the corresponding entry becomes invalid and changes to INV state 302.

PEND_INV state 310 represents a situation where a prefetch request is invalidated before the data is returned from the main memory. Such situation arises when the processor or I/O device writes to the same memory address as specified in one of the pending prefetch requests before the data is loaded into the prefetch buffer. In PEND_INV state 310, the entry waits for the requested data and once the data has been received, the entry is made invalid by moving immediately from PEND_INV state 310 to INV state 302. In this regard, PEND_INV 310 is a temporary state that is used to prevent the state machine or lookup logic from being hit by a request from the processor, since the prefetched data in the entry has become incoherent by the intervening write request.

Another situation arises when an entry is in PEND_VLD state 304 and the processor 102 hits a memory address which is in the process of being prefetched from the main memory. This causes the entry to change its state to PEND_PRF 312. In one implementation, when the entry is in the PEND_PRF state 312, the requested prefetch data retrieved from the main memory 102 is forwarded directly to the processor 102. Normally, prefetched data is temporarily stored in the prefetch buffer 126 before it is forwarded to the processor. In PEND_PRF state 312, the memory controller 128 forwards the requested data to the processor and at the same time, the prefetch data is also forwarded to the prefetch buffer 126, causing the state of the entry to change to PEND_HIT 308. Once the entry receives a signal that the processor has received the prefetch data, the state of the entry returns to INV 302.

Accordingly, a direct link mechanism is incorporated in the memory controller subsystem 116 to forward data directly from the main memory 120 to the processor 102 without having to load and unload the data from the prefetch buffer 126 in certain situations. Each entry in prefetch buffer 126 requires one or more clock cycle(s) to load and unload data. To reduce latency associated with loading and unloading data to/from the prefetch buffer, if a read request hits an entry in the prefetch buffer that has been allocated for a pending prefetch request but is still waiting for the data to return from the main memory, the memory controller subsystem 116 is configured to forward the data directly to the processor bus controller 114 without first storing the data in the prefetch buffer 126. Accordingly, if destination signal 222 and token 224 received by the multiplexer 220 points to a specific entry in the prefetch buffer that is currently in the PEND_PRF state 312, the PEND_PRF 312 state tells the multiplexer 220 to forward the prefetch data directly from the memory controller 128 instead of the prefetch buffer. In this regard, the data is transmitted to the processor in fewer clock cycles than would be required if the data was loaded into the prefetch buffer first before it got forwarded to the processor. For example, assume that an entry in the prefetch buffer has been allocated to receive data from a memory address but the data has not been returned since it can take a number of clock cycles from the time the prefetch request is issued until the data is actually loaded into the prefetch buffer. During this time, if the processor happens to hit the entry that has already started its prefetching process but the data has not been received, the pending prefetch data will be forwarded to the processor once the data is available on the memory controller without having to wait until the data is loaded and unloaded into/from the prefetch buffer.

According to a further aspect of the present invention, a least recently used logic is used to select one of the entries in the prefetch buffer for receiving a new stream of prefetch data. The least recently used logic is implemented by assigning an age to each entry in the prefetch buffer. When an entry is allocated to receive data, its age is initialized to indicate that it is the youngest entry. Then, the age of each entry is incremented each time new prefetch data gets loaded into the prefetch buffer. In this regard, the least recently used entry can be determined by identifying the entry with the oldest age. The use of the least recently used logic limits the amount of time a prefetch data can reside in the prefetch buffer and increases the probability that the requests from the processor will hit the prefetched data. As mentioned earlier, the prefetch buffer contains a number of independent entries. In one embodiment, the prefetch buffer has sixteen entries and can handle about fifteen independent prefetch streams at the same time. Each entry can handle a prefetch stream that is completely independent in address space with respect to other prefetch streams. If the prefetch buffer fills up with sixteen different prefetch streams, and another prefetch stream is desired, this means that data occupying one of the entries in the prefetch buffer must be discarded. In this case, the least recently used logic is used to identify the oldest stream and replaces it with new prefetch stream.

Figure 4:
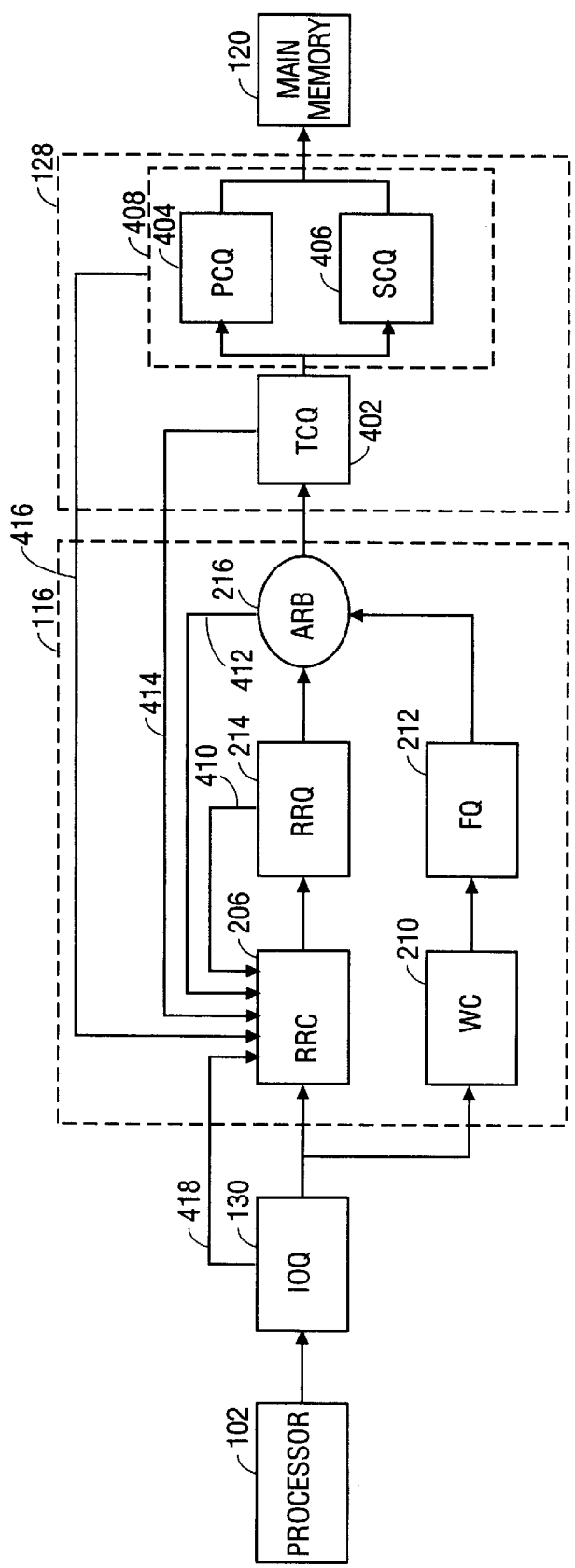
FIG. 4 is a block diagram of a prefetch filtering system according to one embodiment of the invention.

FIG. 4 depicts a block diagram of a prefetch filtering system 400 according to one embodiment of the invention. The filtering system 400 is configured to dynamically filter speculative prefetches based on a number of different factors to prevent speculative prefetches from delaying subsequent non-speculative requests. In one embodiment, a filter logic is incorporated into the RRC 206 to determine whether to dispatch a prefetch request based on signals received from various components within the memory controller hub 112. The filtering system 400 includes configurable registers that can be set to selectively enable or disable any of following factors used to determine whether a prefetch request should be dispatched.

Memory access requests are received from the processor through the processor bus into an in order queue (IOQ) 130. The IOQ 130 is part of the processor bus controller 112, as shown in FIG. 1, and is used to store pending requests from the processor that need to be issued to various designations such as the main memory or I/O devices. The IOQ 130 has a number of entries used for pipelining requests from the processor and to track which data corresponds to which request. As requests get dispatched from IOQ 130 to the rest of the system, the requests get emptied from the IOQ. In one implementation, the IOQ 130 transmits a signal to RRC 206 that indicates if the next command in the IOQ is a processor memory read. In this implementation, the RRC will not dispatch a speculative prefetch if the next command in the IOQ is a processor memory read. If the next command in IOQ is a processor memory read, this means that if a speculative prefetch request is dispatched, the subsequent request from the processor must wait for the speculative prefetch request, thereby slowing down the next request.

The read requests from the RRC 206 are loaded into a read request queue (RRQ) 214. The RRQ 214 includes a logic that counts the number of requests pending in the RRQ. To communicate the number of entries occupied by the RRQ 214, a signal is sent to RRC 206. Based on this signal, RRC 206 will recognized that a certain number of queues inside the RRQ 214 are currently occupied. If more than one entry inside RRQ 214 is filled with pending read request, the speculative prefetch will not be initiated. The initiation of speculative prefetch is avoided in this situation because by the time all the pending requests in the RRQ are completed, it is likely that the memory bus and other system resources will be busy carrying out subsequently dispatched non-speculative request from the processor. Accordingly, the RRC is configured to filter out speculative prefetch requests if it recognizes that more than one entry in RRQ 214 is occupied.

The determination as to whether to initiate a speculative prefetch is also influenced by a high priority write request. The write cache 210 is used to temporarily store data specified in a write request. Occasionally, the write data residing in the write cache 210 is flushed out to the main memory. For example, if a watermark in the write cache 210 indicates that more than a defined number of entries in the write cache are occupied with write data, this causes the write data, destined for the memory controller 128, to be flushed to the flush queue (FQ) 212. Thereafter, if more than a defined number of entries in the FQ 212 are occupied, it sends a high priority flush request to the arbitration logic (ARB) 216. There are other situations that can also trigger high priority flush requests. For example, if the processor hits an entry inside the write cache, the write data needs to be returned from the write cache to the processor, forcing a high priority flush request. In addition, if an I/O device reads an entry in the write cache, the respective entry in the write cache is flushed to the main memory via a high priority flush request. Additionally, if the processor wants to write to the write cache but all entries are occupied with write data, a high priority flush request is sent to ARB 216 so that the loading of the write data to the write cache can be completed. The presence of a high priority write request may be determined by examining a signal from the flush queue that indicates a presence of a pending high priority write request. Thus, if the signal read by the RRC indicates that there is a pending high priority write request, the RRC will not initiate a speculative prefetch.

In one embodiment, the memory controller 128 includes a command queue block having a number of command queues. In the illustrated embodiment, the command queue block contains a two-deep command queue (TCQ) 402 and primary 404 and secondary 406 command queues (PCQ and SCQ) coupled to receive commands from the TCQ 402. The commands queues inside the memory controller 128 provides another means for gauging how busy the memory bus is. If the memory bus is so busy that these queues 402, 404 and 406 are filled with greater a defined number of pending commands, it is likely that speculative prefetches will slow down memory requests to be dispatched later. For example, if a signal from the TCQ 402 indicates that its queues are filled with pending commands, a speculative prefetch will not be dispatched. In one embodiment, the PCQ 404 and SCQ 406, each contains eight entries to hold decoded commands. The PCQ 404 and SCQ 406 have a threshold logic that is programmable by a user. If more than a predefined number of entries in either PCQ or SCQ are filled with pending commands, a signal is sent back to the RRC 206. Thus if the signal from the PCQ or SCQ indicates that the threshold has been exceeded, the RRC will not dispatch a prefetch request.

Figure 5:
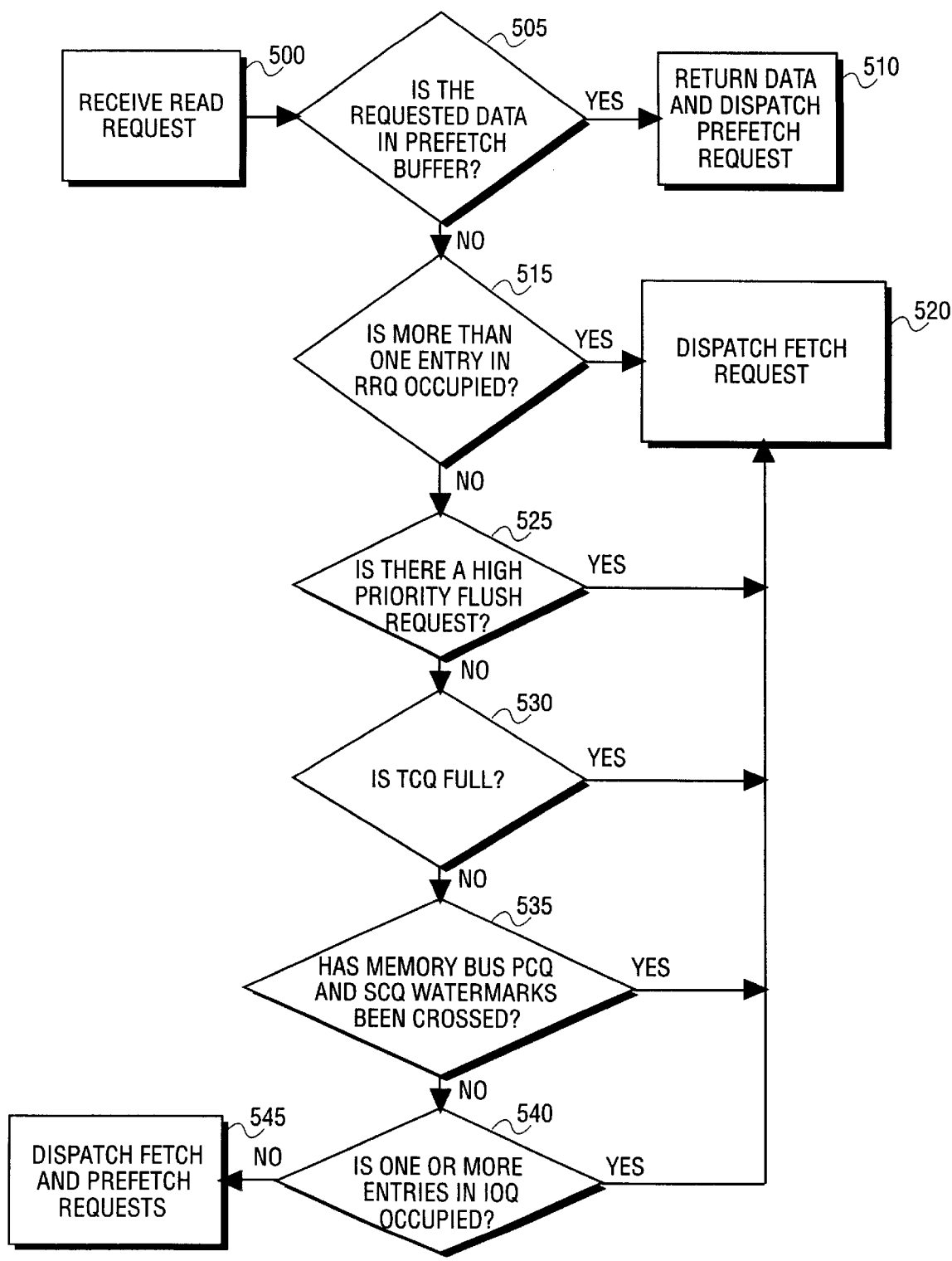
FIG. 5 is a flowchart of operations of the prefetch filtering system according to one embodiment of the invention.

FIG. 5 depicts a flowchart of operations of the filtering system according to one embodiment of the invention. In functional block 500, the RRC receive a read request from the processor. Then in decision block 505, a determination is made whether the requested data is resident in the prefetch buffer by comparing the requested address against the addresses stored in the prefetch buffer. If the read request from the processor hits one of the entries in the prefetch buffer (block 505, yes), a prefetch streaming condition is detected and proceeds to block 510 where the RRC returns the corresponding data to the processor and dispatches a prefetch request to retrieve the data from the next sequential address location from the main memory. However, if the requested data misses the prefetch buffer (block 505, no), the process proceeds to blocks 515–545 to determine if a speculative prefetch request will be dispatched based on a number of factors. These factors are used to gauge how busy the interface (e.g., memory bus) between the main memory and the prefetch buffer will be. This information enables the filtering system to avoid dispatching speculative prefetches when it is likely that the memory bus is busy or will be busy performing non-speculative requests. Any of these factors discussed below can be selectively enabled or disabled by programming configurable registers.

In the illustrated embodiment, if more than one entry inside the RRQ is occupied with pending read request(s) (block 515, yes), the process proceeds to block 520 where the RRC will dispatch a read request to fetch the data requested by the processor but will not dispatch a speculative prefetch request. Similarly, if there is a pending high priority write request (block 525, yes), if the TCQ is full (block 530, yes), if watermarks for PCQ and SCQ has been crossed (block 535, yes) or if one or more entries in IOQ is occupied (or if the next command is a processor memory read) (block 540, yes), the process proceeds to block 520 to dispatch a read request to fetch the data requested by the processor. Otherwise, if the answers to all of the decisions blocks 515, 525, 530, 535 and 540 are no, the RRC will dispatch a read request to fetch the requested data as well as dispatch a prefetch read request to prefetch the next sequential address.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A system comprising:
    a prefetch buffer having a plurality of entries to store prefetch reads, each entry including a storage area for data and address;
    a plurality of state machines, each state machine to track data phase for each entry in said prefetch buffer; and
    a read request controller coupled to said prefetch buffer, wherein said read request controller receives a read request from a processor or I/O devices and controls dispatching of prefetch requests to a main memory.

2. The system of claim 1, wherein said state machine for each entry comprises:
    an invalid state to indicate that the entry contain no valid information;
    a pending valid state to indicate that a prefetch request has been dispatched but data specified in the prefetch request has not been loaded into the entry;
    a valid state to indicate that prefetch request data has been loaded into the entry but the entry has not been hit by a read request from the processor; and
    a pending hit state to indicate that a read request from the processor has hit the entry with a valid prefetch data but data has not yet been forwarded to the processor.

3. The system of claim 1, wherein said state machine for each entry further comprises:
    a pending prefetch state to indicate that data specified in a read request should be received directly from a memory controller in the event the read request hits an entry that is waiting to receive a prefetch data; and
    a pending invalid state to indicate that a prefetch request needs to be invalidated before the data is returned from a main memory in the event a write request hits the same memory address as specified in a pending prefetch request.

4. The system of claim 1, wherein the state of each respective entry in the prefetch buffer changes to invalid state once the processor hits said respective entry and corresponding data has been forwarded to the processor.

5. The system of claim 1, further comprising a mechanism to forward data directly from the memory controller to the processor in the event the read request from the processor hits one of the entries in the prefetch buffer that is waiting for prefetch data to return from the main memory.

6. The system of claim 1, further comprising a prefetch filtering logic responsive to a miss read request from the processor to determine whether or not a prefetch request will be dispatched based on at least one factor indicating if the memory bus will be busy retrieving non-speculative fetch requests.

7. The system of claim 6, wherein said at least one factor includes at least one of the following:
   a signal from an in order queue located in a processor bus controller to store pending requests from the processor that indicates whether or not the in order queue is empty;
   a signal from a read request queue that indicates if the read request queue is filled with more than a defined number of pending requests;
   a signal from a flush queue that indicates presence of a high priority write request; and
   a signal from a command queue located in a memory controller that indicates if the command queue is filled with more than a defined number of pending commands.

8. The system of claim 1, further comprising a prefetch streaming logic to prefetch the next subsequent address from the main memory in the event the prefetch buffer contains the data requested by the processor.

9. The system of claim 1, wherein each entry in said buffer further includes an age to indicate the age of the data residing in each entry.

10. The system of claim 9, further comprising a least recently used logic to select one of the entries in said buffer with the oldest age to receive a new stream of prefetch data.

11. A method comprising:
   receiving a read request from a processor;
   comparing address specified in said read request against addresses stored in a plurality of entries in a prefetch buffer;
   forwarding data specified in said read request from the prefetch buffer to the processor in response to a read hit from said processor;
   dispatching a prefetch request to prefetch the next sequential address in response to a read hit from said processor;
   dispatching a read request to a memory controller to fetch data specified in said read request in response to a read miss from said processor; and
   determining whether or not a prefetch request will be dispatched based on at least one factor indicating if a memory bus will be busy retrieving non-speculative fetch requests in response to a read miss from said processor.

12. The method of claim 11, further comprising invalidating data of an entry in the prefetch buffer in the event the processor hits the entry and corresponding data has been forwarded to the processor.

13. The method of claim 11, further comprising selecting one of the entries in said prefetch buffer with the oldest age to receive a new stream of prefetch data.

14. The method of claim 11, wherein said at least one factor includes at least one of the following:
   a signal from an in order queue located in a processor bus controller to store pending requests from the processor that indicates whether or not the in order queue is empty;
   a signal from a read request queue that indicates if the read request queue is filled with more than a defined number of pending requests;
   a signal from a flush queue that indicates presence of a high priority write request; and
   a signal from a command queue located in a memory controller that indicates if the command queue is filled with more than a defined number of pending commands.

15. A computer system comprising:
   a processor coupled to a processor bus;
   a main memory; and
   a memory controller subsystem coupled between said processor bus and said main memory to coordinate data transfer to and from the main memory at the request of the processor, wherein said memory controller subsystem includes a prefetch buffer having a plurality of entries to store prefetch reads, each entry including a storage area for data and address, a read request controller coupled to said prefetch buffer, wherein said read request controller receives a read request from a processor or I/O devices and controls dispatching of prefetch requests to said main memory, and a read request queue to hold read requests dispatched from the read request controller.

16. The computer system of claim 15, further comprising a plurality of state machines, each state machine to track data phase for each entry in said prefetch buffer, wherein the state of each respective entry in the prefetch buffer changes to invalid state once the processor hits said respective entry and corresponding data has been forwarded to the processor.

17. The computer system of claim 15, further comprising a mechanism to forward data directly from a memory controller to the processor in the event the read request from the processor hits one of the entries in the prefetch buffer that is waiting for prefetch data to return from the main memory.

18. The computer system of claim 17, wherein said mechanism to forward data directly comprises a multiplexer having a plurality of inputs coupled to receive data from said prefetch buffer, a write cache and the memory controller, wherein said multiplexer is dynamically programmable to couple one of the inputs to an output terminal based on a signal received from the read request controller.

19. The computer system of claim 15, further comprising a prefetch filtering logic responsive to a miss read request from the processor to determine whether or not a prefetch request will be dispatched based on at least one factor indicating if the memory bus will be busy retrieving non-speculative fetch requests.

20. The computer system of claim 15, further comprising a prefetch streaming logic to prefetch the next subsequent address from the main memory in the event the prefetch buffer contains the data requested by the processor.

21. The computer system of claim 15, further comprising a least recently used logic to select one of the entries in said buffer with the oldest age to receive a new stream of prefetch data.

* * * * *